(12) United States Patent
Habersberger et al.

(10) Patent No.: US 10,870,754 B2
(45) Date of Patent: Dec. 22, 2020

(54) OVERMOLD MATERIAL FOR POLYCARBONATE

(71) Applicant: Dow Global Technologies LLC, Midland, MI (US)

(72) Inventors: Brian M. Habersberger, Freeport, TX (US); Colin LiPiShan, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 54 days.

(21) Appl. No.: 16/311,860

(22) PCT Filed: Jun. 15, 2017

(86) PCT No.: PCT/US2017/037635
§ 371 (c)(1),
(2) Date: Dec. 20, 2018

(87) PCT Pub. No.: WO2017/222906
PCT Pub. Date: Dec. 28, 2017

(65) Prior Publication Data
US 2020/0115541 A1    Apr. 16, 2020

Related U.S. Application Data

(60) Provisional application No. 62/353,963, filed on Jun. 23, 2016.

(51) Int. Cl.
| | | |
|---|---|---|
| B32B 27/32 | (2006.01) | |
| B32B 27/36 | (2006.01) | |
| C08L 53/00 | (2006.01) | |
| C08F 210/02 | (2006.01) | |
| C08J 5/12 | (2006.01) | |
| C08L 23/08 | (2006.01) | |

(52) U.S. Cl.
CPC ............ *C08L 53/005* (2013.01); *B32B 27/32* (2013.01); *B32B 27/365* (2013.01); *C08F 210/02* (2013.01); *C08J 5/12* (2013.01); *C08L 23/0815* (2013.01); *C08L 23/0853* (2013.01); *C08L 23/0869* (2013.01); *C08L 53/00* (2013.01)

(58) Field of Classification Search
None
See application file for complete search history.

(56) References Cited

U.S. PATENT DOCUMENTS

| | | |
|---|---|---|
| 4,877,827 A | 10/1989 | Van Der Groep |
| 5,723,543 A | 3/1998 | Modic |
| 7,608,668 B2 | 10/2009 | Shan et al. |
| 7,842,747 B2 | 11/2010 | Gu et al. |
| 7,893,166 B2 | 2/2011 | Shan et al. |
| 7,947,793 B2 | 5/2011 | Marchand et al. |
| 8,404,780 B2 | 3/2013 | Weaver et al. |
| 9,023,939 B2 | 5/2015 | Ansems et al. |
| 2010/0167074 A1* | 7/2010 | Bunnelle .............. B32B 7/12 428/512 |
| 2013/0167909 A1 | 7/2013 | Amamiya et al. |
| 2014/0096825 A1 | 4/2014 | Bonekamp et al. |
| 2014/0174509 A1 | 6/2014 | Bonekamp et al. |
| 2015/0010765 A1* | 1/2015 | Munro ................. C08L 53/00 428/516 |

FOREIGN PATENT DOCUMENTS

| | | | |
|---|---|---|---|
| JP | 2008119879 | * | 5/2008 |
| WO | WO 2006001548 | * | 1/2006 |

\* cited by examiner

*Primary Examiner* — David J Buttner
(74) *Attorney, Agent, or Firm* — Quarles & Brady LLP

(57) ABSTRACT

The present disclosure provides an article. In an embodiment, the article includes a first structural component and a second structural component. The first structural component includes a polycarbonate composition. The second structural component includes a polymeric blend of (i) an ethylene/α-olefin multi-block copolymer, and (ii) a functional polymer modifier that is an ethylene/ester copolymer. The second structural component is adhered to the first structural component.

9 Claims, No Drawings

OVERMOLD MATERIAL FOR POLYCARBONATE

BACKGROUND

It is desirable in many instances to mold an elastomeric material directly onto a hard polymeric substrate such as polycarbonate to provide a soft grip or a soft cover, for example. However, many elastomeric materials are olefin-based and are non-polar making such elastomeric materials incompatible with polycarbonate, which is polar in nature. This non-polar/polar dichotomy makes adhesion problematic between conventional olefin-based elastomers and polycarbonate.

The art recognizes a need for elastomeric materials that adhere to polycarbonate. A need further exists for olefin-based elastomeric materials that provide suitable adhesion to polycarbonate for overmold applications in particular.

SUMMARY

The present disclosure provides an article. In an embodiment, the article includes a first structural component and a second structural component. The first structural component includes a polycarbonate composition. The second structural component includes a polymeric blend of (i) an ethylene/α-olefin multi-block copolymer, and (ii) a functional polymer modifier that is an ethylene/ester copolymer. The second structural component is adhered to the first structural component.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference).

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all components and percents are based on weight, and all test methods are current as of the filing date of this disclosure.

"Blend", "polymer blend" and like terms is a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate can comprise a blend.

"Composition" and like terms is a mixture of two or more materials. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

An "ethylene-based polymer" and like terms is an olefin-based polymer that comprises more than 50 weight percent polymerized ethylene monomer (based on the total amount of polymerizable monomers).

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

Melt flow rate (MFR) is measured in accordance with ASTM D 1238, Condition 230° C./2.16 kg (g/10 minutes).

Melt index (MI) is measured in accordance with ASTM D 1238, Condition 190° C./2.16 kg (g/10 minutes).

Melt temperature, or "Tm" as used herein (also referred to as a melting peak in reference to the shape of the plotted DSC curve), is typically measured by the DSC (Differential Scanning calorimetry) technique for measuring the melting points or peaks of polyolefins as described in U.S. Pat. No. 5,783,638, wherein the Tm is the second heat melt temperature taken at a ramp rate of 10° C./min and Tm is largest peak. The heat of fusion (Hf) (measured in Joules/gram, J/g) and the peak melting temperature are reported from the second heat curve. Peak crystallization temperature is determined from the cooling curve. Crystallization temperature, Tc, is determined from the DSC cooling curve as above except the tangent line is drawn on the high temperature side of the crystallization peak. Where this tangent intersects the baseline is the extrapolated onset of crystallization (Tc). It should be noted that many blends comprising two or more polyolefins will have more than one melting point or peak, many individual polyolefins will comprise only one melting point or peak.

An "olefin-based polymer," as used herein, is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

"Overmolding," "overmolded" and like terms is a process in which one resin is injected into a mold containing a pre-placed substrate, and molded over this substrate. Overmolding is typically used to improve the performance and properties of a final product by overmolding one polymeric resin over another polymer substrate. Overmolding can be used to form seamless, integrated parts. Nonlimiting examples of overmolded parts include flexible grip handles on power tools and kitchen utensils that provide additional gripping properties without the hygienic concern normally associated with mechanical assemblies. The substrate may be any suitable material such as a polymer material, metal or ceramic part.

Peel Test (90°) or 90° peel test—The 90° peel test is performed as follows. A one-inch (2.54 cm) wide strip is punched into the overmolded layer. The substrate is clamped into an apparatus that slides horizontally on lubricated rails. One edge of the strip is clamped to the vertical jaws of the load frame. During the test, this strip is peeled upwards at a rate of 2 inches (5.08 cm)/min. The sliding apparatus moves freely during the test to maintain the 90 degree peel angle. The force vs. displacement curve is measured, and the adhesion strength is recorded in Newton per millimeter (N/mm) from the force observed between 1 inch (2.54 cm) and 2 inch (5.08 cm) of displacement.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

DETAILED DESCRIPTION

The present disclosure is directed to an article. In an embodiment, the article includes a first structural component and a second structural component. The first structural component includes a polycarbonate composition. The second structural component includes a polymeric blend. The polymeric blend includes (i) an ethylene/α-olefin multi-block copolymer, and (ii) a functional polymer modifier that is an ethylene/ester copolymer. The second structural component is adhered to the first structural component.

The present article includes a first structural component and a second structural component. A "structural component," as used herein, is a discrete part of a larger physical article. Each structural component may include, or otherwise may be composed of, a composite of materials. Nonlimiting examples of suitable structural components include substrate, film, film layer, coating, grip, case, casing, cover, handle, container, panel, and housing.

1. First Structural Component

The first structural component of the present article is composed of a polycarbonate composition. A "polycarbonate" is a thermoplastic resin typically produced by the reaction of a carbonic acid derivative, with a dihydric phenol, such as an aliphatic or aromatic diol. The dihydric phenol has the general formula HO—Z—OH, wherein Z comprises a mononuclear or polynuclear aromatic group of 6-30 carbon atoms, to which the oxygen atoms are directly linked. The aromatic group may comprise one or more heteroatoms and may be substituted with one or more groups, for example one or more oxygens, nitrogens, sulfur, phosphorous and/or halogens, one or more monovalent hydrocarbon radicals, such as one or more alkyl, cycloalkyl or aryl groups and/or one or more alkoxy and/or aryloxy groups.

In an embodiment, the Z group of the dihydric phenol has the Formula (I) below.

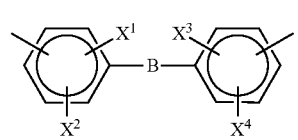

Formula (I)

wherein B is a single bond, a divalent hydrocarbon radical containing 1-15 carbon atoms, or 1 to 6 carbon atoms, or —C(CH$_3$)$_2$—, —S—S—, —S(O)—, —S(O$_2$)—, —O— or —C(O)— and X$^1$, X$^2$, X$^3$ and X$^4$ independently are hydrogen; halogen, or chlorine, bromine or fluorine; a monovalent hydrocarbon radical, such as alkyl, cycloalkyl or aryl; alkoxy or aryloxy. The alkyl groups contain 1 to 6, or 1 to 4 carbon atoms, such as methyl, ethyl, n-propyl, i-propyl, n-butyl, s-butyl or t-butyl or the pentyl or hexyl groups. The cycloalkyl groups contain 5 or 6 carbon atoms, such as cyclopentyl or cyclohexyl. The aryl and aryloxy groups contain 6-8 carbon atoms, such as phenyl, benzyl, phenyloxy, tolyl or xylyl. The alkoxy groups contain 1 to 6 carbon atoms, or 1 to 4 carbon atoms, such as the methoxy, ethoxy, n-propoxy, i-propoxy, n-butoxy, s-butoxy or t-butoxy groups. In an embodiment, both phenolic hydroxy groups in the dihydric phenol HO—Z—OH are arranged in para-position to the radical B in the group of Formula 1.

In an embodiment, the dihydric phenol is selected from bisphenol A, bisphenol AP, tetrabromo bisphenol A, and tetramethyl bisphenol A. In a further embodiment, the dihydric phenol is bisphenol A.

The carbonic acid derivative may be a carbonate precursor which contains leaving groups. The leaving groups can be displaced from the carbonyl carbon in attack by the anion of a dihydric phenol compound. Nonlimiting examples of suitable carbonate precursor include diesters of carbonic acid, and carbonyl halides or acyl halides. In an embodiment, the carbonate precursor is phosgene.

The polymerization process involves the reaction of the dihydric phenol, a bisphenol, and the carbonate precursor such as a disubstituted carbonic acid derivative (such as phosgene), or a haloformate (such as a bishaloformate of a glycol or dihydroxy benzene). These components are reacted by way of the phase boundary process in which the dihydric phenol compound is at least partially dissolved and deprotonated in an aqueous alkaline solution to form bisphenolate (phenate) and the carbonate precursor is supplied to the process, preferably dissolved in an organic solvent. The other phase of the two phase mixture is a non-reactive organic solvent immiscible with water selected from among those in which the carbonate precursor and polycarbonate product are soluble.

The carbonate precursor (i.e., phosgene), is contacted with the mixture of the aqueous alkaline mixture of the dihydric phenol compound and water-immiscible non-reactive organic solvent. A coupling catalyst can be added either during or after addition of the carbonate precursor without significantly affecting the resulting polymer molecular weight and molecular weight distribution.

The mixture is agitated in a manner which is sufficient to disperse or suspend droplets of the solvent containing the carbonate precursor in the aqueous alkaline mixture. Reaction between the organic and aqueous phases created by such agitation yields the bis(carbonate precursor) ester of the dyhydric phenol compound which either remains as an intermediate, remains as a monomer or oligomer (if no coupling catalyst is present) or polymerizes to the carbonate polymer (when the catalyst is present).

A chain terminator (a monofunctional compound containing a functional group, frequently a hydroxyl group), may be used to produce an anion capable of displacing an unreacted hydroxyl or carbonic acid ester group which remains on the end of the polymer chain.

Reactive acyl halides other than phosgene are condensation polymerizable and may be used in polycarbonates as terminating compounds (mono-functional), comonomers (di-functional) or branching agents (tri-functional or higher).

Upon completion of polymerization, the organic and aqueous phases are separated to allow purification of the organic phase and recovery of the polycarbonate product therefrom.

Nonlimiting examples of suitable polycarbonates are polycarbonates sold under the tradename CALIBRE from Sumika Styron Polycarbonate Limited, such as CALIBRE 301-15.

In an embodiment, the polycarbonate composition is a blend composed of polycarbonate and (i) acrylonitrile-butadiene-styrene (ABS), (ii) a silicon-polycarbonate copolymer, and (iii) a combination of (i) and (ii).

The polycarbonate composition may optionally include one or more fillers. Nonlimiting examples of suitable fillers include talc, calcium carbonate, coal fly ash, carbon black, glass fibers, and wood flour, and combinations thereof.

In an embodiment, the polycarbonate composition of first structural component is composed solely of polycarbonate.

2. Second Structural Component

The present article includes a second structural component. The second structural component is composed of a polymeric blend of (i) an ethylene/α-olefin multi-block copolymer and (ii) a functional polymeric modifier that is an ethylene/ester copolymer.

A. Ethylene/α-Olefin Multi-Block Copolymer

The term "ethylene/α-olefin multi-block copolymer" is an ethylene-based polymer and is a copolymer that includes ethylene and one or more copolymerizable α-olefin comonomers in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

$(AB)_n$ 

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB 

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In an embodiment, the ethylene multi-block copolymer is defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$Tm > -2002.9 + 4538.5(d) - 2422.2(d)^2$, and/or (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$\Delta T > -0.1299(\Delta H) + 62.81$ for ΔH greater than zero and up to 130 J/g $\Delta T \geq 48°$ C. for ΔH greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$Re > 1481 - 1629(d)$; and/or (D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G' (100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, or 4 to 12 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3- pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the ethylene/α-olefin multi-block copolymer is void of, or otherwise excludes, styrene, and/or vinyl aromatic monomer, and/or conjugated diene.

In an embodiment, the ethylene/α-olefin multi-block copolymer consists of ethylene and a comonomer that is a $C_4$-$C_8$ α-olefin. The $C_4$-$C_8$ α-olefin is selected from butene, hexene, and octene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. 51, line 29 through Col. 54, line 56. The process is also described, for example, in the following: U.S. Pat. Nos. 7,608,668; 7,893,166; and 7,947,793.

In an embodiment, the ethylene/$C_4$-$C_8$ α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;

and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or less than 125° C.; and/or (ii) a density from 0.86 g/cc, or 0.866 g/cc or 0.87 g/cc, or 0.88 g/cc to 0.89 g/cc;

(iii) 50-85 wt % soft segment and 40-15 wt % hard segment; and/or (iv) from 10 mol %, or 13 mol %, or 14 mol %, or 15 mol % to 16 mol %, or 17 mol %, or 18 mol %, or 19 mol %, or 20 mol % octene in the soft segment; and/or (v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (vi) a melt index (MI) from 1 g/10 min, or 2 g/10 min, or 5 g/10 min, or 7 g/10 min to 10 g/10 min, or 15 g/10 min, or 20 g/10 min, or 25 g/10 min, or 30 g/10 min; and/or (vii) a Shore A hardness from 65, or 70, or 71, or 72 to 73, or 74, or 75, or 77, or 79, of 80; and/or (viii) an elastic recovery (Re) from 50%, or 60% to 70%, or 80%, or 90%, at 300% min$^{-1}$ deformation rate at 21° C. as measured in accordance with ASTM D 1708; and/or (ix) a polydisperse distribution of blocks and a polydisperse distribution of block sizes.

In an embodiment, the ethylene/octene multi-block copolymer is sold under the Tradename INFUSE™ and available from The Dow Chemical Company, Midland, Mich., USA. In a further embodiment, the ethylene/octene multi-block copolymer is INFUSE™ 9807.

In an embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

The present ethylene/α-olefin multi-block copolymer may comprise two or more embodiments disclosed herein.

B. Functional Polymer Modifier

The second structural component also includes a functional polymer modifier that is an ethylene/ester copolymer in addition to the ethylene/α-olefin multi-block copolymer. The ethylene/ester copolymer is an ethylene-based copolymer comprising ethylene and an ester comonomer, the ethylene/ester copolymer having the Structure 1 below.

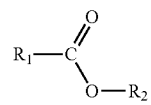

Structure (1)

wherein each of $R_1$ and $R_2$ independently is a $C_1$-$C_2$ hydrocarbonyl group.

A "hydrocarbon," as used herein, is a compound that contains only hydrogen and carbon. The hydrocarbon can be (i) branched or unbranched, (ii) saturated or unsaturated (iii) cyclic or acyclic, and (iv) any combination if (i)-(iii). A "hydrocarbonyl group" is a hydrocarbon substituent having a valence (typically univalent).

Nonlimiting examples of the ethylene/ester copolymer of Structure (1) include ethylene vinyl acetate copolymer, ethylene methylacrylate copolymer, ethylene ethylacrylate copolymer, and combinations thereof.

In an embodiment, the ethylene/ester copolymer of Structure (1) is ethylene vinyl acetate copolymer having and vinyl acetate content from 15 wt %, or 20 wt %, or 23 wt %, or 25 wt % to 28 wt %, or 30 wt %, or 35 wt %. Weight percent is based on the total weight of the ethylene vinyl acetate copolymer.

In an embodiment, the ethylene ester copolymer of Structure (1) is ethylene ethylacrylate copolymer having an ethylacrylate content from 15 wt %, or 18 wt %, or 20 wt % to 23 wt %, or 25 wt %. Weight percent is based on the total weight of the ethylene ethylacrylate copolymer.

In an embodiment, the polymeric blend includes from 70, or 75, or 80 to 85, or 90 weight percent of the ethylene/α-olefin multi-block copolymer and from 30, or 25, or 20 to 15, or 10 weight percent of the ethylene/ester copolymer. Weight percent is based on total weight of the polymeric blend. It is understood that the amount of ethylene/α-olefin multi-block copolymer and the reciprocal amount of ethylene/ester copolymer yield 100 weight percent for the polymeric blend.

In an embodiment, the polymeric blend consists of from 70, or 75, or 80 to 85, or 90 weight percent ethylene/$C_4$-$C_8$ α-olefin multi-block copolymer and from 30, or 25, or 20 to 15, or 10 weight percent ethylene ethylacrylate copolymer.

In an embodiment, the polymeric blend consists of from 70, or 75, or 80 to 85, or 90 weight percent ethylene/$C_4$-$C_8$ α-olefin multi-block copolymer and from 30, or 25, or 20 to 15, or 10 weight percent ethylene vinyl acetate copolymer.

In an embodiment, the polymeric blend consists of from 70, or 75, or 80 to 85, or 90 weight percent ethylene/$C_4$-$C_8$ multi-block copolymer and from 30, or 25, or 20 to 15, or 10 weight percent ethylene ethylacrylate copolymer.

3. Overmold Component

The present article includes the second structural component that adheres to the first structural component. In an embodiment, adherence between the structural components is the result of an overmolding process whereby the polymeric blend of ethylene/α-olefin multi-block copolymer and ethylene/ester copolymer is overmolded onto the first structural component (containing the polycarbonate composition). In this sense, the article is an overmolded article. The overmolded article exhibits a 90° peel strength between the second structural component and the first structural component from 2.5 N/mm, or 3.0 N/mm, or 3.1 N/mm, or 3.3 N/mm, or 3.5 N/mm, or 3.7 N/mm, or 3.9 N/mm to 4.0 N/mm, or 4.1 N/mm, or 4.3 N/mm, or 4.5 N/mm, or 4.7 N/mm, or 4.9 N/mm, or 5.0 N/mm.

In an embodiment, the second structural component includes from 80 wt %, or 83 wt %, or 85 wt % to 87 wt %, or 89 wt %, or 90 wt % of the ethylene/α-olefin multi-block copolymer, and from 20 wt %, or 17 wt %, or 15 wt %, to 13 wt %, or 11 wt %, 10 wt % of an ethylene vinyl acetate copolymer. It is understood that the amount ethylene/α-olefin multi-block copolymer and the reciprocal amount ethylene vinyl acetate copolymer yield 100 wt % based on the total weight of the second structural component. The article has a 90° peel strength from 3.0 N/mm, or 3.1 N/mm, or 3.3 N/mm, or 3.5 N/mm, or 3.7 N/mm, or 3.9 N/mm to 4.0 N/mm, or 4.1 N/mm, or 4.3 N/mm, or 4.5 N/mm, or 4.7 N/mm, or 4.9 N/mm, or 5.0 N/mm between the second structural component and the first structural component. In a further embodiment, the second structural component consists of the ethylene/α-olefin multi-block copolymer and the ethylene vinyl acetate copolymer in the foregoing weight percentages and exhibits the foregoing 90° peel strength.

In an embodiment, the second structural component includes from 80 wt %, or 83 wt %, or 85 wt % to 87 wt %, or 89 wt %, or 90 wt % of the ethylene/α-olefin multi-block copolymer, and from 20 wt %, or 17 wt %, or 15 wt %, to 13 wt %, or 11 wt %, 10 wt % of the ethylene ethylacrylate copolymer. It is understood that the amount ethylene/α-olefin multi-block copolymer and the reciprocal amount ethylene ethylacrylate copolymer yield 100 wt % based on the total weight of the second structural component. The article has a 90° peel strength from or 3.0 N/mm, or 3.1 N/mm, or 3.3 N/mm, or 3.5 N/mm, or 3.7 N/mm, or 3.9 N/mm to 4.0 N/mm, or 4.1 N/mm, or 4.3 N/mm, or 4.5 N/mm, or 4.7 N/mm, or 4.9 N/mm, or 5.0 N/mm between the second structural component and the first structural component. In a further embodiment, the second structural component consists of the ethylene/α-olefin multi-block copolymer and the ethylene ethylacrylate copolymer in the foregoing weight percentages and exhibits the foregoing 90° peel strength.

Nonlimiting examples of overmolded articles with the second structural component overmolded to the first structural component include a multilayer sheet, a multilayer carpet, an adhesive layer on a substrate, an automotive part, a coating on a substrate, an automotive skin on an automotive panel, a multilayer roofing construction article, a steering wheel, a consumer durable, a grip, grips for handtools (screwdriver), grips for power tools (drill motor, circular band saw, door latches, a handle, handles on luggage, automotive products (e.g., skins, head rests, arm rests, headliners, carpet underlayment, etc.), injection molded toys, computer components (e.g., key pads, computer casings). The present article may also be co-extruded, co-extrusion blowmolded, or double-injection molded. It is believed that overmolding onto a warm substrate and/or aging are helpful in improving adhesion between the first structural component and the second structural component.

By way of example, and not limitation, examples of the present disclosure are provided.

EXAMPLES

Materials used in the comparative samples and in the examples are provided in Table 1 below.

TABLE 1

Materials

| Material | Description | Source |
| --- | --- | --- |
| INFUSE 9500 | 5 MI, 0.877 g/cm³ density ethylene-octene multi-block copolymer | Dow Chemical |
| AMPLIFY TY1053H | 2 MI, 0.958 g/cm³ density high density polyethylene with maleic anhydride | Dow Chemical |
| Lotader 8900 (EMA) | 6 MI glycidyl methalrylate - 30 wt % ethyl acrylate, 62 wt % ethylene, 8 wt % glycidyl methacrylate | Arkema |
| PRIMACOR 3330 (EAA) | 5.5 MI ethylene acrylic acid, 6.5 wt % acrylic acid | Dow Chemical |
| AMPLIFY EA 101 (EEA) | 6 MI, 0.931 g/cm³ ethylene ethyl acrylate, 18 wt % ethyl acrylate | Dow Chemical |
| ELVAX 265 (EVA) | 3 MI ethylene vinyl acetate, 28 wt % vinyl acetate | DuPont |
| CALIBRE 301-15 (PC) | 1.2 g/cm³, 15 MFR (300° C., 1.2 kg) general purpose polycarbonate | Trinseo |

Polymeric blends of ethylene/α-olefin multi-block copolymer and a functional polymer modifier are prepared under the processing conditions set forth in Table 2 formulations for the comparative samples and inventive examples are in weight percent based on total weight of the polymeric blend. Each polymeric blend contains 15 wt % of a functional polymer modifier and 85 wt % INFUSE 9500 ethylene/octene multi-block copolymer.

The formulations are dry-blended and fed to a Krauss Maffei injection molder at the processing conditions listed in Table 2. Polycarbonate (PC) plaques (10.1 cm×15.2 cm) are fabricated in a first step and are then conditioned for 24 hrs in a vacuum oven at 80° C. After conditioning, the PC plaques are re-inserted into the mold and then the polymeric blend is injected on top to form overmolded articles. The overmolded articles are then cooled to room temperature and subjected to the 90° peel test after 24 hrs of conditioning.

TABLE 2

| Processing Conditions | | | | | | |
|---|---|---|---|---|---|---|
| | | Formulation- At press blends | | | | |
| | 100% PC | 15% Amplify 1053H with 85% 9500 Comp. A | 15% Lotader AX 8900 with 85% 9500 Comp. B | 15% Primacor 3330 with 85% 9500 Comp. C | 15% Amplify EA with 85% 9500 Inv. 1 | 15% Elvax 265 with 85% 9500 Inv. 2 |
| Barrel and Mold Temperatures | | | | | | |
| Feed throat (° C.) | 30 | 30 | 30 | 30 | 30 | 30 |
| Zone 1 Temperature (° C.) | 280 | 175 | 175 | 175 | 175 | 175 |
| Zone 2 Temperature (° C.) | 300 | 220 | 220 | 220 | 220 | 220 |
| Zone 3 Temperature (° C.) | 320 | 280 | 280 | 280 | 280 | 280 |
| Zone 4 Temperature (° C.) | 320 | 280 | 280 | 280 | 280 | 280 |
| Zone 5 Temperature (° C.) | 320 | 280 | 280 | 280 | 280 | 280 |
| Nozzle Temperature (° C.) | 310 | 275 | 275 | 275 | 275 | 275 |
| Mold Temperature (° C.) | 38 | 38 | 38 | 38 | 38 | 38 |
| Extruder | | | | | | |
| RPM (1/min) | 100 | 150 | 150 | 150 | 150 | 150 |
| Backpressure (Bar) | 15 | 15 | 15 | 15 | 15 | 15 |
| Plast. Time (s) | 5.69 | 5.74 | 5.31 | 5.61 | 5.24 | 5.6 |
| Dosage (ccm) | 50 | 45 | 45 | 45 | 45 | 45 |
| Suckback (ccm) | 2 | 5 | 5 | 5 | 5 | 5 |
| Optimal Injection | | | | | | |
| Injection Speed #1 (ccm/s) | 200 | 200 | 200 | 200 | 200 | 200 |
| Injection pressure #1 (bar) | 2000 | 2000 | 2000 | 2000 | 2000 | 2000 |
| Injection Time #1 (s) | 0.68 | 0.15 | 0.2 | 0.19 | 0.15 | 0.15 |
| Switch Over Position (ccm) | 15 | 20 | 20 | 20 | 20 | 20 |
| Switch over melt pressure (bar) | 1324 | 411 | 620 | 648 | 449 | 388 |
| Max Melt pressure (bar) | 1339 | 424 | 626 | 687 | 480 | 396 |
| Cushion (ccm) | 12 | 7 | 7 | 6.9 | 7 | 7 |
| Hold | | | | | | |
| Hold Pressure (Bar) | 600 | 180 | 180 | 180 | 180 | 180 |
| Hold Time (s.) | 10 | 25 | 25 | 25 | 25 | 25 |
| Time | | | | | | |
| Cool Time (s.) | 25 | 20 | 20 | 20 | 20 | 20 |
| Dosage Time (s.) | 42.7 | 62.2 | 62.3 | 62.2 | 62.1 | 62.3 |

Percentages—are weight percent based on total weight of the composition or blend.

Comparative Samples (CS) and inventive examples of overmolded articles with first structural component composed of PC and second structural component composed of the polymeric materials are set forth in Table 3. The composition of the second structural component and the 90° peel strength results for overmolded articles are provided in Table 3 below.

TABLE 3

| | Overmolded Articles | | | | | | |
|---|---|---|---|---|---|---|---|
| Component | | | LOTADER AX 8900 | | | | |
| Functional comonomer | INFUSE 9500 N/A | AMPLIFY TY 1053H Maleic anhydride | Methyl acrylate and glycidyl methacrylate | PRIMACOR 3330 Acrylic acid | AMPLIFY EA 101 Ethyl acrylate | ELVAX 265 Vinyl acetate | 90° Peel (N/mm) |
| CS A | 85% | 15% | — | — | — | — | 2.9 |
| CS B | 85% | — | 15% | — | — | — | 0.44 |
| CS C | 85% | — | — | 15% | — | — | 0.08 |
| Inv. Ex 1 | 85% | — | — | — | 15% | — | 4.0* |
| Inv. Ex. 2 | 85% | — | — | — | — | 15% | 4.0* |

Percentages—are weight percent based on total weight of the polymeric blend.
All samples exhibited adhesive failure, however, those with a* failed via yielding of the TPE.

With addition of 10-20 wt % (or 15 wt %) of the adhesion modifier for ethylene ethyl acrylate copolymer and ethylene vinyl acetate copolymer in Examples 1 and 2, a surprising increase in the interfacial bond strength is observed. Examples 1 and 2 exhibit an interfacial peel strength of greater than or equal to 4 N/mm, which exceeds the yield stress of the polymeric blend (TPE material) (i.e., the blend of adhesion modifier with ethylene/α-olefin multi-block copolymer). In other words, the overmold interface is stronger than the TPE as the TPE material fails before the overmold interface. Comparatively, interfacial bond failure with peel strength of less than 3 N/mm is observed in the comparative samples containing maleic anhydride, methyl acrylate/glycidyl methacrylate, and acrylic acid.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An article comprising:
    a first structural component comprising a polycarbonate composition; and
    a second structural component consisting of a polymeric blend consisting of (i) from 80 wt % percent to 90 wt % of an ethylene/α-olefin multi-block copolymer consisting of ethylene monomer and α-olefin comonomer, and (ii) from 20 wt % to 10 wt % a functional polymer modifier that is an ethylene/ester copolymer;
    wherein the ethylene/ester copolymer is an ethylene-based copolymer comprising an ester comonomer having the Structure (1)

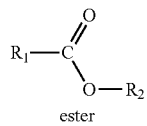

Structure (1)

wherein each of R1 and R2 independently is a C1-C2 hydrocarbonyl group; and
    the second structural component is adhered to the first structural component.

2. The article of claim 1, wherein the ethylene/α-olefin multi-block copolymer consists of ethylene monomer and octene comonomer.

3. The article of claim 1, wherein the ethylene/ester copolymer is selected from the group consisting of: (i) ethylene vinyl acetate copolymer, (ii) ethylene methacrylate copolymer, (iii) ethylene ethylacrylate copolymer, and (iv) combinations thereof.

4. The article of claim 1 wherein the second structural component is overmolded to the first structural component.

5. The article of claim 1 having a 90° peel strength from 2.5 N/mm to 5.0 N/mm between the second structural component and the first structural component.

6. The article of claim 5 wherein the second structural component directly contacts the first structural component.

7. An article comprising:
    a first structural component comprising a polycarbonate composition; and
    a second structural component consisting of (i) from 80 wt % to 90 wt % the ethylene/α-olefin multi-block copolymer consisting of ethylene monomer and α-olefin comonomer, and (ii) from 20 wt % to 10 wt % an ethylene vinyl acetate copolymer; and
    wherein the second structural component directly contacts and is adhered to the first structural component; and
    the article has a 90° peel strength from 3.0 N/mm to 5.0 N/mm between the second structural component and the first structural component.

8. An article comprising:
    a first structural component comprising a polycarbonate composition; and
    a second structural component comprising (i) from 80 wt % to 90 wt % of the ethylene/α-olefin multi-block copolymer, the ethylene/α-olefin multi-block copolymer consisting of ethylene monomer and α-olefin comonomer, and (ii) from 20 wt % to 10 wt % of the an ethylene ethylacrylate copolymer; and
    wherein the second structural component directly contacts and is adhered to the first structural component; and
    the article has a 90° peel strength from 3.0 N/mm to 5.0 N/mm between the second structural component and the first structural component.

9. The article of claim 8 wherein the second structural component consists of the ethylene/α-olefin multi-block copolymer and the ethylene ethylacrylate copolymer.

* * * * *